United States Patent
Erhard

(10) Patent No.: US 9,097,328 B2
(45) Date of Patent: Aug. 4, 2015

(54) TRANSMISSION WITH A MAIN GEARBOX AND A POWER TAKE OFF UNIT

(75) Inventor: Hans Erhard, Kungälv (SE)

(73) Assignee: Volvo Lastvagnar AB, Göteborg (SE)

( * ) Notice: Subject to any disclaimer, the term of this patent is extended or adjusted under 35 U.S.C. 154(b) by 424 days.

(21) Appl. No.: 13/805,348

(22) PCT Filed: Jun. 24, 2010

(86) PCT No.: PCT/EP2010/003794
§ 371 (c)(1),
(2), (4) Date: Dec. 19, 2012

(87) PCT Pub. No.: WO2011/160656
PCT Pub. Date: Dec. 29, 2011

(65) Prior Publication Data
US 2013/0098180 A1    Apr. 25, 2013

(51) Int. Cl.
*F16H 37/06* (2006.01)
*B60K 17/28* (2006.01)
*F16H 57/04* (2010.01)

(52) U.S. Cl.
CPC ............. *F16H 37/065* (2013.01); *B60K 17/28* (2013.01); *F16H 57/0445* (2013.01); *F16H 57/0495* (2013.01)

(58) Field of Classification Search
CPC ... F16H 37/065; F16H 57/0445; F16H 37/06; B60K 17/28
See application file for complete search history.

(56) References Cited

U.S. PATENT DOCUMENTS

| | | | | |
|---|---|---|---|---|
| 3,016,769 | A | * | 1/1962 | Christenson et al. .......... 475/134 |
| 3,147,643 | A | * | 9/1964 | Breting et al. ................... 475/59 |
| 4,186,618 | A | * | 2/1980 | Richards ......................... 74/339 |
| 4,987,795 | A | * | 1/1991 | Nguyen ....................... 74/606 R |
| 6,951,526 | B2 | * | 10/2005 | Kuhstrebe et al. .............. 477/97 |
| 2004/0112171 | A1 | * | 6/2004 | Kuhstrebe et al. ............ 74/730.1 |
| 2006/0037422 | A1 | * | 2/2006 | Kuhstrebe et al. .............. 74/340 |

FOREIGN PATENT DOCUMENTS

GB      2261488 A    5/1993
JP      610027369 A  2/1986

OTHER PUBLICATIONS

International Search Report (Mar. 25, 2011) for corresponding International application No. PCT/EP2010/003794.

* cited by examiner

*Primary Examiner* — David M Fenstermacher
(74) *Attorney, Agent, or Firm* — WRB-IP LLP

(57) ABSTRACT

A transmission includes a main gearbox and a power take off unit, wherein the power take off unit can be engaged with and disengaged from the main gearbox through an engagement mechanism having at least a first position engaging the main gearbox and the power take off unit and a second position disengaging the power take off unit from the main gearbox, wherein the power take off unit is provided with at least one lubricant inlet. The engagement mechanism includes a valve member and when the engagement mechanism is positioned in its second position, the valve member blocks the lubricant inlet, thereby preventing lubricant from flowing through the lubricant inlet into the power take off unit. When the engagement mechanism is positioned in its first position, the lubricant inlet is open and lubricant can flow through the lubricant inlet into the power take off unit.

8 Claims, 2 Drawing Sheets

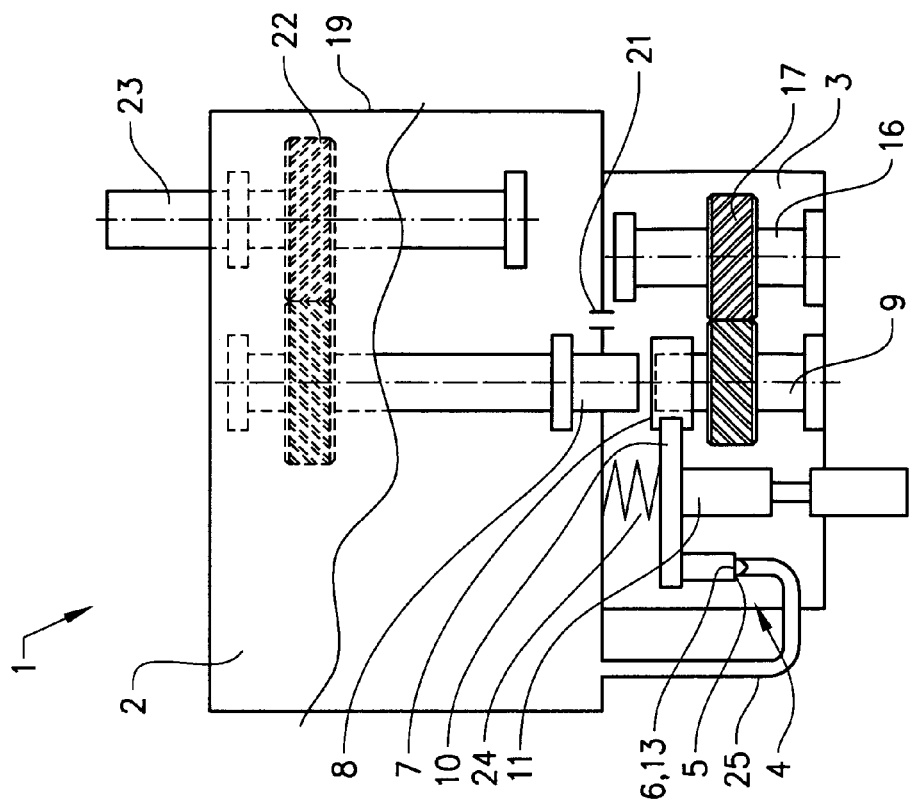
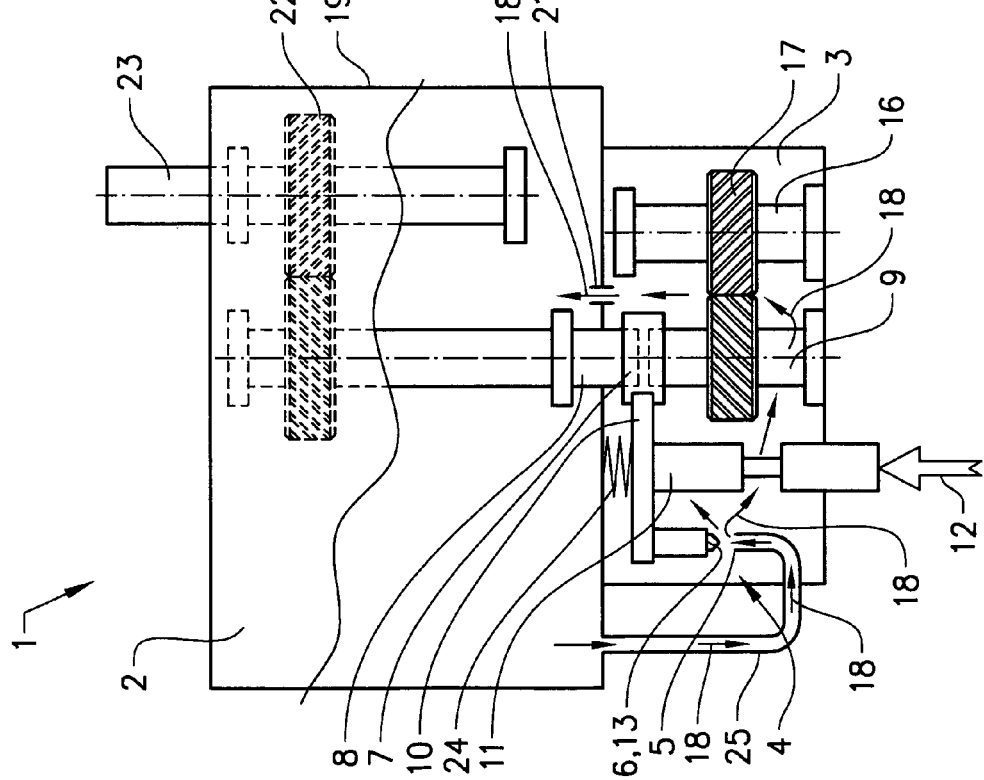

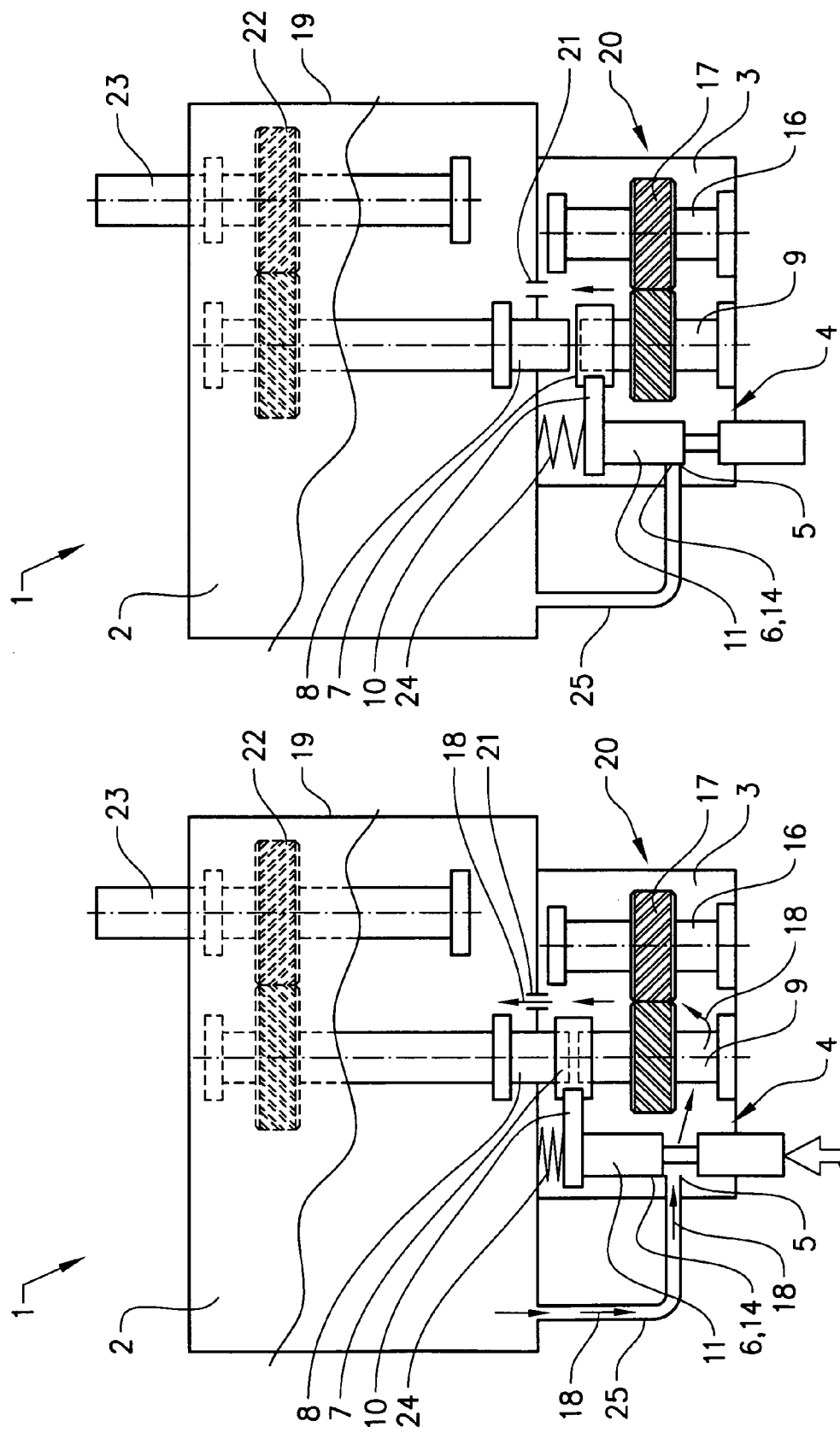

1

TRANSMISSION WITH A MAIN GEARBOX AND A POWER TAKE OFF UNIT

BACKGROUND AND SUMMARY

The invention relates to the field of vehicle transmissions and especially to the field of vehicle transmissions with a power take off unit.

A general trend in the development of vehicle transmissions with power take off is the need for increased power output. One negative consequence of this is that the increased power generates a higher temperature in the power take off unit. Commonly a transmission comprises a main gearbox and a power take off unit. To cool the power take off unit, it is adapted with a lubrication circulation system. Usually, the lubrication circulation system is common with the main gearbox, wherein a part of the gearbox lubricant is derived into the power take off unit for cooling and lubrication. The lubricant is thereafter lead back to the main gearbox. In known designs, the lubrication circulation system can not be turned off exclusively for the power take off unit, which means that the lubrication circulation system runs for the power take off unit at all times it runs for the main gearbox.

With increased power output, more oil is needed for cooling and lubrication of the power take off unit. However, to assure the lubrication and cooling of the main gearbox, just a limited portion of the lubricant of the transmission can be used for the power take off unit. Thereby, by deriving too much of the lubricant to the power take off unit, the cooling and lubrication of the main gearbox could become deficient.

It is desirable to suggest a simple and efficient supply of lubricant to the power take off unit, without risking a deficiency in lubrication of the main gearbox.

Thus, the present invention is based on a transmission comprising a main gearbox and a power take off unit and wherein the power take off unit can be engaged with, respectively disengaged from, the main gearbox through an engagement mechanism having at least a first position engaging the main gearbox and the power take off unit and a second position disengaging the power take off unit from the main gearbox, wherein the power take off unit is provided with at least one lubricant inlet.

Further, the present invention is characterised in, that said engagement mechanism comprises a valve member, whereby when said engagement mechanism is positioned in its second position, the valve member is blocking said lubricant inlet, and thereby preventing lubricant to flow through the lubricant inlet into the power take off unit. When said engagement mechanism is positioned in its first position, i.e. is engaged with the main gearbox, the lubricant inlet is open and lubricant can flow through the lubricant inlet, into the power take off unit.

An on/off-function is thereby created for the lubricant inlet in the power take off unit. Due to the blocking of the lubricant inlet, when the power take of unit is disengaged from the main gearbox, the lubricant can be used in the main gearbox where it is needed and the lubricant is thereby used more efficiently. Further, energy is saved, since lubricant does not have to be pumped around to parts of the transmission that are not in use. The inventive on/off-function is easy to adapt, because it mainly uses existing components, and no extra valve or control unit has to be introduced in the transmission. The inventive valve member could thereby even be introduced in an existing transmission.

The valve member of the power take off unit can be arranged on any part that is moving with said engagement mechanism. The engagement mechanism preferably comprises:

an engaging sleeve, which when the engagement mechanism is positioned in its first position, engaging a drive shaft of the main gearbox and a driven shaft of the power take off unit, and when the engagement mechanism is positioned in its second position, disengaging said driven shaft of the power take off unit from said drive shaft of the main gearbox, a shift fork, provided to execute a movement of the engaging sleeve between said first and second position, and a piston, provided to transmit a shift force from a drive source to the shift fork to execute said movement.

Said valve member is arranged on one of said engaging sleeve, shift fork or piston. Obviously, each of these parts can be divided into two or more subparts and/or having other parts moving along with them. The valve member can be arranged, on either of said parts or any other part moving with the engaging mechanism. It is up to designer of the transmission to choose on which part the valve member should be located; e.g. dependent of the available space in the housing of the power take off unit and the location of the lubricant inlet. The choice of location of the valve member on either of these parts does not affect the object of the invention. In fact, the designer's freedom of choice of location of the valve member indicates the versatility and the strength of the invention.

In an embodiment of the inventive valve member, it comprises a rod protruding from the engaging mechanism, i.e. one of said parts of the engagement mechanism. When the engaging mechanism is moved from its first to its second position, said rod is guided into the lubricant inlet, which thereby is blocked. The rod and the lubricant inlet are thereby adapted such that, when the rod is positioned inside the inlet, no lubricant can pass through the lubricant inlet.

In another embodiment of the inventive valve member, it comprises a surface located on the engagement mechanism, i.e. on one of said parts of the engagement mechanism. Said surface is adapted such that, when the engaging mechanism is moved from its first to its second position, said surface is slid over the oil inlet, such that the oil inlet is blocked. Further, said surface of the valve member as well as the surface of the lubricant inlet are thereby adapted such, that they have a tight fit, when said surface of the valve member is located in front of the lubricant inlet.

Both of the two embodiments of the valve member described above, can be located either on the engagement sleeve, the shift fork, the piston or any other part moving along with the engagement mechanism. For the invention, the specific design of the valve member is not important. It can be adapted to be formed in one piece with said parts or be mounted thereon, as long as the valve member fulfils its purpose; i.e. to prevent lubricant to flow through the lubrication inlet when the power take off unit is disengaged.

It is not given from the invention that the main gearbox and the power take off unit have a common lubrication system. However, the invention shows superior application in a transmission having a main gearbox and a power take off unit with a common lubrication system.

The lubricant in the lubrication circulation system can be a mineral or synthetic oil or any other suitable lubricant.

Preferably, the lubricant is circulated in the lubrication system by a pump, which can be either mechanically or electrically driven. A forced circulation of the lubrication is beneficial to secure a needed cooling and lubrication of all the parts in the power take off unit as well as the main gearbox.

The choice of powering method—mechanically or electrically—is left to the designer and is not of importance for the invention. The valve member is designed to have two positions, to allow a flow of lubricant and to prevent a flow of lubricant. The flow rate of the lubricant is dependent the pump of the lubrication system. Usually, the pump is driven by the motor/engine to which the transmission is connected. Thereby is also the flow rate of the lubricant dependent on the output power of the engine, hence a greater power out put results in greater flow rate of the lubricant.

Commonly, a pneumatic, electrical or hydraulic power source drives the engaging mechanism. Either of these control methods are suitable for the invention.

The inventive transmission is adapted to be mounted in a vehicle; preferably a utility vehicle such as a tractor, a dump truck or a crane truck. However, the inventive transmission can also be adapted for industrial applications.

BRIEF DESCRIPTION OF THE DRAWINGS

The invention will now be described, by way of example, with reference to the accompanying schematic drawings in which similar and/or comparable components carry the same reference numerals, in which:

FIG. 1 shows a first embodiment of the inventive transmission, and

FIG. 2 shows a second embodiment of the inventive transmission.

DETAILED DESCRIPTION

FIGS. 1a, b and 2a, b shows schematic views of a first and second embodiment of the inventive transmission 1. The FIGS. 1a and 2a shows the inventive transmission 1, as the engagement mechanism 4 is in its first position, wherein the FIGS. 1b and 2b shows the inventive transmission, when the engagement mechanism 4 is in its second position.

The transmission 1 comprises a main gearbox 2 and a power take off unit 3, wherein the power take off unit 3 can be engaged and disengaged from the main gearbox 2 through the engagement mechanism 4. The transmission 1 is schematically disclosed, the main gearbox 2 with a symbolic pair of gear wheels 22 connecting the driven shaft 23 of the main gearbox with the drive shaft 8. The power take off unit 3 has two shafts 9, 16, the driven shaft 9 and an output shaft 16, which are interconnected with a pair of gearwheels 17. However, the invention is just as applicable to a transmission with a power take off unit with more than one gearwheel pair.

Said engagement mechanism 4 comprises an engagement, sleeve 7, a shift fork 10 and a valve member 6, wherein an outer power source (not shown) generates a force 12 that acts on the valve member (piston) 6. The outer power source can for example be a pneumatic, electric or hydraulic motor. When the force 12 is applied on the piston 6, the force 12 is transferred to the shift fork 10, which actuates the engaging sleeve 7, such that the engaging sleeve 7 connects the drive shaft 8 of the main gearbox 2 with the driven shaft 9 of the power take off unit 3. The main gearbox 2 and the power take off unit 3 are thereby engaged, such that a power output from the drive shaft 16 of the power take off unit 3 is possible.

The engaging mechanism 4 comprises a valve member 6 which opens and closes the lubricant inlet 5, as the engagement mechanism 4 is engaging respectively disengaging the power take off unit 3 from the main gearbox 2. Two different embodiments of the valve member 6 are shown. In FIGS. 1a and 1b, the valve member 6 is a pin 13 extending from one of the parts of the engaging mechanism 4 and in FIG. 2, the valve member 6 is a surface 14 located on one of the parts of the engaging mechanism 4. Below both the embodiments will be described in conjunction with the disclosed examples in FIGS. 1a, b and 2a, b.

In the FIGS. 1a and 2a, the engagement mechanism 4 is in its first position, i.e. the power take off unit 3 is engaged with the main gearbox 2, and thereby is the lubricant inlet 5 open, and lubricant can flow into the power take off unit 3. In the FIGS. 1b and 2b, the engagement mechanism 4 is in its second position, i.e. the power take off unit 3 is disengaged from main gearbox 2, whereby the lubricant inlet 5 closed, and no lubricant can flow into the power take off unit 3.

FIG. 1a, b shows a valve member 6 which is designed as a pin 13 protruding from the shift fork 10. In FIG. 1a, as the engagement mechanism 4 is in it first position, i.e. the power take off unit 3 is engaged, the pin 13 is outside the lubricant inlet 5 which thereby is open. The lubricant can thereby flow (see arrows 18) into and through the power take off unit 3, which gets lubricated and cooled by the lubricant. As long as the outer power source (not shown) applies the force 12 to the piston 11, the engagement mechanism 4 keeps the engaging mechanism 4 in its first position. When the force 12 disappears, the engaging mechanism moves from its first to its second position, i.e. from the position showed in FIG. 1a to the position showed in FIG. 1b. The movement is executed by a spring force generated from the spring 24, which also assures that the engaging mechanism 4 is positioned in the second position when the force 12 is not applied to the piston 11. The pin 13 is thereby moved from its position outside the lubricant inlet 5 to a position inside the lubricant inlet 5. Lubricant can thereby not flow into the power take off unit 3 anymore. Obviously, the pin 13 can be arranged on any other part moving with the engaging mechanism 4, such as the engagement sleeve 7 or the piston 10.

The embodiment of FIG. 2 differs from the embodiment in FIG. 1 just in that the valve member 6 comprises a surface 14, which when the engagement mechanism 4 is in its first position the lubricant inlet 5 is open, and lubricant can flow (see arrows 18) into the power take off unit 3, and when the engagement mechanism 4 moves from its first to its second position, the surface 14 slides in front of the lubricant inlet 5 such that it is blocked.

Further, the main gearbox 2 and the power take off unit 3 of the transmission 1 is located in individual housings 19, 20, however mechanically connected with each other. According to the figures, the drive shaft 8 of the main gearbox stretching in to the housing 20 of the power take off unit 3, in which the engaging mechanism 4 is located. However, without leaving the scope of the invention, it could be the other way around, i.e. the driven shaft 9 of the power take off unit 3 could stretch into the housing 19 of the main gearbox 2. Wherein, the engaging mechanism 4 is located such that it can shift between its two positions and still control the opening and closing of the lubricant inlet 5 according to the invention.

Still further, a lubricant outlet 21 is located between the two housings 19, 20, through which, the lubricant returns into the main gearbox 2 from the power take off unit 3.

Obviously, any constructive embodiment, particularly any layout of the components of the engagement mechanism and the valve member as well as in relation to one another, to the extent they are technically expedient and without they influencing the function of the invention, falls under the scope of protection of the present claims, even if these embodiments are not explicitly illustrated in the figures or mentioned in the description.

The invention claimed is:

1. Transmission comprising a main gearbox and a power take off unit, wherein the power take off unit can be engaged with, respectively disengaged from, the main gearbox through an engagement mechanism having at least a first position engaging the main gearbox and the power take off unit and a second position disengaging the power take off unit from the main gearbox, wherein the power take off unit is provided with at least one lubricant inlet, wherein the engagement mechanism comprises a valve member, whereby when the engagement mechanism is positioned in its second position, the valve member blocks the lubricant inlet and prevents lubricant from flowing through the lubricant inlet into the power take off unit, and, when the engagement mechanism is positioned in its first position, the lubricant inlet is open and lubricant can flow through the lubricant inlet into the power take off unit.

2. Transmission according to claim 1, wherein the engagement mechanism at least comprises;
   an engaging sleeve, which when the engagement mechanism is positioned in its first position, engaging a drive shaft of the main gearbox and a driven shaft of the power take off unit, and when the engagement mechanism is positioned in its second position, disengaging the driven shaft of the power take off unit from the drive shaft of the main gearbox,
   a shift-fork, provided to execute a movement of the engaging sleeve between the first and second position, and
   a piston, provided to transmit a shift force from a drive source to the shift fork to execute the movement,
   wherein the valve member is arranged on one of the engaging sleeve, shift fork or piston or any other part moving with the engaging mechanism.

3. Transmission according to claim 1, wherein the valve member comprises a rod protruding from the engaging mechanism, and when the engaging mechanism is moved from its first to its second position, the rod is guided into the oil inlet, which thereby is blocked.

4. Transmission according to claim 1, wherein the valve member comprises a surface located on the engagement mechanism, wherein the surface is adapted such that when the engaging mechanism is moved from its first to its second position, the surface is slid over the oil inlet, such that the oil inlet is blocked.

5. Transmission according to claim 1, wherein the power take off unit and the main gearbox have a common lubrication system.

6. Transmission according to claim 5, wherein a pump is arranged to circulate a lubricant in the lubrication system and wherein the pump is mechanically driven or electrically driven.

7. Transmission according to claim 1, wherein the engaging, mechanism is pneumatically or electrically controlled.

8. Vehicle comprising the transmission according to claim 1.

* * * * *